United States Patent [19]
Guskey et al.

[11] Patent Number: 5,599,574
[45] Date of Patent: Feb. 4, 1997

[54] PROCESS FOR REDUCING IN-MOULD TIMES FOR CHOCOLATE CONFECTIONS CONTAINING REDUCED CALORIE FATS

[75] Inventors: Gerald J. Guskey, Montgomery; James A. Hellyer, Milford, both of Ohio

[73] Assignee: The Procter & Gamble Company, Cincinnati, Ohio

[21] Appl. No.: 311,812

[22] Filed: Sep. 26, 1994

[51] Int. Cl.⁶ .................................................. A23G 1/00
[52] U.S. Cl. ........................ 426/660; 426/607; 426/804
[58] Field of Search .................................. 426/607, 804, 426/660

[56] References Cited

U.S. PATENT DOCUMENTS

| | | | |
|---|---|---|---|
| 4,859,483 | 8/1989 | Sollich | 426/519 |
| 4,888,196 | 12/1989 | Ehrman et al. | 426/601 |
| 5,023,106 | 6/1991 | Ehrman et al. | 426/660 |
| 5,066,510 | 11/1991 | Ehrman et al. | 426/607 |
| 5,142,071 | 8/1992 | Kluesener et al. | 554/172 |
| 5,258,197 | 11/1993 | Wheeler et al. | 426/607 |
| 5,275,835 | 1/1994 | Masterson et al. | 426/607 |
| 5,288,512 | 2/1994 | Seiden | 426/607 |

OTHER PUBLICATIONS

Menefie 1980 Chocolate, Cocoa and Confectionery: Science and Technology; Second edition AVI Publishing Westport CT pp. 142–143, 148–161, 494–507.
Alikonis 1979 Candy Technology AVA Publishing Westport CT pp. 76–77.
Bokkenheuser, E.; "*Chocolate Moulding for the 80's*", 34th P.M.C.A. Production Conference; (1980); pp. 91–93.

*Primary Examiner*—Carolyn Paden
*Attorney, Agent, or Firm*—Tara M. Rosnell; Rose Ann Dabek

[57] ABSTRACT

The present invention relates to a process for reducing the in-mould time required for preparing chocolate confectionery products which contain low calorie cocoa butter substitutes. In the first step of the process of the present invention, an untempered chocolate confectionery composition is formed. The chocolate confectionery composition contains a reduced calorie fat which contains certain reduced calorie triglycerides. The untempered chocolate confectionery composition is heated to a temperature ranging from about 37.8° C. (100° F.) to about 65.5° C. (150° F.) to form a melt. Next, the melt is adjusted to a temperature ranging from about 29.4° C. (85° F.) to about 48.9° C. (120° F.). Bar moulds are then filled with the untempered chocolate confectionery composition and any air bubbles present in the chocolate confectionery composition are removed. After substantially all of the air bubbles present in the chocolate confectionery composition are removed, the moulds containing the chocolate confectionery compositions are rapidly cooled to a temperature sufficiently low to achieve a chocolate confectionery composition/mould interface temperature of less than about 22.2° C. (72° F.). The moulds containing the chocolate are held at this temperature for from about 0 to about 15 minutes. Chocolate confectionery products prepared according to this process will have acceptable gloss and will have organoleptic properties par with chocolate confectionery products prepared according to prior processes.

20 Claims, No Drawings

PROCESS FOR REDUCING IN-MOULD TIMES FOR CHOCOLATE CONFECTIONS CONTAINING REDUCED CALORIE FATS

TECHNICAL FIELD

The present invention relates to a process for reducing the in-mould time required for preparing chocolate confectionery compositions which contain certain reduced calorie fats. Reduced calorie chocolate confections which have acceptable gloss can be prepared according to the process of the present invention.

BACKGROUND OF THE INVENTION

Chocolate is an extremely popular and versatile food product which is characterized by a smooth, creamy consistency upon mastication. Chocolate derives its desirable eating qualities largely from the melting properties of cocoa butter which is typically present in chocolate at about 32% by weight. The melting behavior of cocoa butter is the result of its unique triglyceride composition. However, this unique triglyceride composition, like the triglyceride composition of other natural fats, is relatively high in calories. Approximately 50% of the calories in chocolate products come from fat which is exclusively or predominantly cocoa butter. This means that persons who must restrict their intake of calories must either reduce the amount of chocolate products they consume, or in the extreme case, completely exclude such products from their diet.

Low calorie cocoa butter substitutes which have physical properties similar to cocoa butter have been developed. See, for example, U.S. Pat. No. 5,288,512; Issued Feb. 22, 1994 to Seiden and Wheeler et al; U.S. Pat. No. 5,258,197; Issued Nov. 2, 1993. Chocolate confectionery compositions containing these low calorie cocoa butter substitutes are described, for example, in U.S. Pat. Nos. 4,888,196 and 5,023,106 to Ehrman et al; Issued on Dec. 19, 1989 and Jun. 11, 1991, respectively and in U.S. Pat. No. 5,275,835; Issued Jan. 4, 1994 to Masterson et al.

Unfortunately, moulded chocolate confections prepared according to the processes taught by these references require prolonged storage in the moulds, ranging from six hours to six days. This extensive in-mould time greatly increases the process costs for these low calorie chocolate confectionery products. Accordingly, it would be desirable to be able to prepare moulded chocolate confectionery products which contain low calorie cocoa butter substitutes, but which require shorter in-mould storage periods.

It has now been found that the in-mould storage time of chocolate confectionery products containing low calorie cocoa butter substitutes can be reduced to less than about 15 minutes when the chocolate confections are prepared according to the process of the present invention. Chocolate confections prepared according to this process will have acceptable gloss and will have organoleptic properties par with chocolate confections prepared by prior processes.

SUMMARY OF THE INVENTION

The present invention relates to a process for reducing the in-mould time required for preparing chocolate confectionery products which contain a reduced calorie fat. In the first step of the process of the present invention, an untempered, reduced calorie chocolate confectionery composition is formed. The untempered chocolate confectionery composition is then heated to a temperature ranging from about 37.8° C. (100° F.) to about 65.5° C. (150° F.) to form a melt. Next, the melt is adjusted to a temperature ranging from about 29.4° C. (85° F.) to about 48.9° C. (120° F.). Bar moulds are then filled with the untempered chocolate confectionery composition and any air bubbles present in the chocolate confectionery composition are removed. After substantially all of the air bubbles present in the chocolate confectionery composition are removed, the moulds containing the chocolate confectionery compositions are rapidly cooled to a temperature sufficiently low to achieve a chocolate confectionery composition/mould interface temperature of less than about 22.2° C. (72° F.). The moulds containing the chocolate are held at this temperature for from about 0 to about 15 minutes. Chocolate confectionery products prepared according to this process will have acceptable gloss and will have organoleptic properties par with chocolate confectionery products prepared according to prior processes.

DETAILED DESCRIPTION OF THE INVENTION

The present invention relates to a process for reducing the in-mould time required for preparing moulded chocolate confections which contain certain reduced calorie fats and which have acceptable gloss. In one embodiment of the present invention, the chocolate confectionery products prepared according to the process of the present invention comprise:

a. a flavor enhancing amount of a flavor component;
b. from about 25 to about 45% of a fat component comprising:
  (1) at least about 70% of a reduced calorie fat having:
    (a) at least about 85% combined MLM and MML triglycerides;
    (b) no more than about 5% combined LLM and LML triglycerides;
    (c) no more than about 2% LLL triglycerides;
    (d) no more than about 4% MMM triglycerides;
    (e) no more than about 7% other triglycerides; wherein M is a $C_6$ to $C_{10}$ saturated fatty acid residue and L is a $C_{20}$ to C24 saturated acid residue;
    (f) a fatty acid composition having:
      (i) from about 40 to about 60% combined $C_8$ and $C_{10}$ saturated fatty acids,
      (ii) a ratio of $C_8$ to $C_{10}$ saturated fatty acids of from about 1:2.5 to about 2.5:1,
      (iii) from about 40 to about 60% behenic fatty acid,
  (2) up to about 15% milk fat;
  (3) up to about 20% cocoa butter;
  (4) no more than about 4% diglycerides; and
c. from about 55 to about 75% other nonfat confectionery ingredients.

In another embodiment of the present invention, the chocolate confectionery products prepared according to the process of the present invention comprise:

a. a flavor enhancing amount of a flavor component;
b. from about 25 to about 45% of a fat component comprising:
  (1) at least about 70% of a reduced calorie fat containing at least about 25% of a mixture of SSL, SLS, LLS and LSL having at least about 75% combined SLS and SSL triglycerides and from about 0.1 to about 10% combined LLS and LSL triglycerides, with from about 10 to about 25% acetic acid residues and from 01. to 10% residues of propionic acid, butyric acid or a mixture of propionic and butyric acid in the total mixture; wherein S=a short chain fatty acid residue selected from propionic acid, butyric acid and acetic acid and L=a long chain fatty acid selected from C18 to C22 saturated fatty acids (2) up to about 15% milk fat;

(3) up to about 20% cocoa butter;

(4) no more than about 4% diglycerides; and c. from about 55 to about 75% other nonfat confectionery ingredients.

The reduced calorie fats defined above provides significantly fewer calories in chocolate confectionery products than fat compositions comprising conventional triglycerides.

The process of the present invention comprises the steps of: 1) forming an untempered chocolate confectionery composition; 2) heating the untempered chocolate confectionery composition to a temperature ranging from about 37.8° C. (100° F.) to about 65.5° C. (150° F.) to form a melt and then adjusting the melt to a temperature ranging from about 29.4° C. (85° F.) to about 48.9° C. (120° F.); 3) filling bar moulds with the untempered chocolate confectionery composition; 4) removing air bubbles from the chocolate confectionery composition; 5) rapidly cooling the mould containing the chocolate confectionery composition to temperatures sufficiently low to achieve a chocolate confectionery composition/mould interface temperature of about 22.2° C. (72° F.) or less; and 6) holding the mould containing the chocolate confectionery composition at these temperatures from about 0 to about 15 minutes. In order to prevent softening, the chocolate confectionery composition is typically stored at a temperature ranging from about 4.4° C. (40° F.) to about 22.2° C. (72° F.) for at least about 1 hour prior to final storage at temperatures of 21.1° C. or higher. These process steps are described in more detail as follows:

I. Forming an Untempered Chocolate Confectionery Composition

The process of the present invention comprises as a first step forming an untempered chocolate confectionery composition. This confectionery composition comprises a flavor component, a fat component and other nonfat confectionery ingredients. These are described in detail as follows:

A. Flavor Component

The untempered chocolate confectionery compositions utilized in the process of the present invention comprise a flavor-enhancing amount of a chocolate flavor component. The chocolate flavor component comprises flavor constituents which impart positive flavor characteristics, and optionally non flavor constituents normally present in flavor compositions, e.g. flavor carriers. As used herein, the term "flavor-enhancing amount" refers to an amount of the flavor component sufficient to impart positive flavor characteristics to the composition. As such, the amount of the flavor component sufficient to be "flavor enhancing" can depend on the flavor source used, the flavor effects desired and like factors. Typically, the flavor component (nonfat constituents) comprises from about 0.1 to about 25% of the composition.

Suitable chocolate flavors can be derived from chocolate-liquor, cocoa powder, or blends thereof. These chocolate materials (fat plus nonfat ingredients) are typically included at from about 5 to about 25% of the composition. As used herein, "chocolate-liquor" refers to the solid or semi-plastic food prepared by finely grinding cacao nibs. Chocolate-liquor usually contains from about 50 to about 58% cocoa butter fat. As used herein, "cocoa powder" refers to the residual material remaining after part of the cocoa butter fat has been removed from ground cacao nibs. Cocoa powder usually contains from about 10 to about 22% cocoa butter fat. The chocolate confectionery compositions utilized in the process of the present invention can also contain other sources of flavor, including vanillin, ethyl vanillin, spices, coffee, brown sugar, etc., or mixtures of these flavors.

B. Fat Component

The chocolate confectionery compositions utilized in the process of the present invention further comprises a fat component. As used herein, the term "fat component" refers to all triglycerides, diglycerides and monoglycerides present in the composition. For example, if chocolate-liquor is used to formulate chocolate compositions, the cocoa butter portion is included as part of the fat component. If milk solids are used, for example, in milk chocolate-flavored compositions, any milk fat present is included as part of the fat component.

The fat component comprises from about 25 to about 45% of the composition. The fat component can comprise a reduced calorie fat, milk fat, cocoa butter and diglyceride fats. The fat component preferably comprises from about 28 to about 35% of the composition.

1. Reduced Calorie Fat

The major constituent in this fat component is a reduced calorie fat. By "reduced calorie fat" as used herein is meant fats that provide an at least about 10% and preferably an at least about 30%, reduction in calories relative to corn oil. These reduced calorie fats usually provide between about 20% and about 50% reduction in calories. The reduction in calories provided by these reduced calorie fats is based on the net energy gain (in Kcal) of rats that have ingested a diet containing the reduced calorie fat, relative to the net energy gain (in Kcal) of rats that have ingested an identical diet, but containing corn oil instead of the reduced calorie fat. The test diets used are nutritionally adequate to support both maintenance and growth of the rats. Total food intake and fat/oil intake are also matched between the two diet groups so that differences in net carcass energy gain are due entirely to the utilizable energy content of the fat/oil. ("Net energy gain" is based on the total carcass energy (in Kcal) of the rats fed the test diet for some period of time (usually 4 weeks), reduced by the mean starting carcass energy (in Kcal) determined from a study of a different group of rats of the same sex, strain, and similar body weight fed a test diet that does not contain the fat/oil. "Total carcass energy" is determined by the dry carcass energy program (Kcal per gram) multiplied by the dry weight of the carcass (in grams). "Carcass energy per gram" is based on the carcass energy (in Kcal) as determined by bomb Calorimetry of a homogeneous sample of the total dry carcass. All of these energy values are the average of a representative sample of rats (i.e., 10 rats).)

The particular amount of reduced calorie fat present in the fat component depends upon the degree of calorie reduction desired and the particular mouth melt and firmness properties desired for the chocolate confectionery composition. These reduced calorie fats comprise at least about 70% of the fat component. Preferably, these reduced calorie fats comprise at least about 75% of the fat component, more preferably at least about 80%, and most preferably at least about 85% of the fat component.

Reduced calorie fats useful in the fat component are characterized by particular levels of triglycerides. In one embodiment of the present invention the triglycerides are selected from MLM, MML, LLM, LML, MMM and LLL triglycerides, wherein M is a medium chain $C_6$ to $C_{10}$ saturated fatty acid residue and L is a long chain $C_{20}$ to $C_{24}$ saturated fatty acid residue. See Selden; U.S. Pat. No. 5,288,512; Issued Feb. 22, 1994 (herein incorporated by reference), which discloses reduced calorie fats useful in the fat component, and especially Examples 1 and 2 for methods for making same. In another embodiment of the present invention, the triglycerides are selected from SLS, SSL, LLS, LSL, SSS and LLL triglycerides, wherein S is a short chain C2 to C5 saturated fatty acid residue and L is a long chain C18 to C22 saturated fatty acid. See Wheeler et al; U.S. Pat. No. 5,258,197; Issued Nov. 2, 1993 (herein incorporated by reference).

"MML" represents a triglyceride containing a long chain saturated acid residue in the #1 or #3 position (an end position) with two medium chain saturated fatty acid residues in the remaining two positions, while "MLM" represents a triglyceride with a long chain fatty acid residue in the #2 position (the middle position) and two medium chain fatty acid residues in the #1 and #3 positions. Similarly, "LLM" represents a triglyceride with a medium chain fatty acid residue in the #1 or #3 position and two long chain fatty acid residue in the remaining two positions, while "LML" represents a triglyceride with a medium chain fatty acid residue in the #2 position and two long chain fatty acid residues in the #1 and #3 positions.

"SSL" represents a triglyceride containing a long chain saturated acid residue in the #1 or #3 position (an end position) with two short chain saturated fatty acid residues in the remaining two positions, while "SLS" represents a triglyceride with a long chain fatty acid residue in the #2 position (the middle position) and two short chain fatty acid residues in the #1 and #3 positions. Similarly, "LLS" represents a triglyceride with a short chain fatty acid residue in the #1 or #3 position and two long chain fatty acid residue in the remaining two positions, while "LSL" represents a triglyceride with a short chain fatty acid residue in the #2 position and two long chain fatty acid residues in the #1 and #3 positions.

"MMM" represents a triglyceride containing medium chain saturated fatty acid residues in all three positions.: Similarly, "LLL" represents a triglyceride containing long chain saturated fatty acid residues at all three positions, and "SSS" represents a triglyceride containing short chain saturated fatty acid residues at all three positions.

To provide desirable mouth melt characteristics in the chocolate confection utilized in the process of the present invention, the level of mono-long chain (MLM and MML and SLS and SSL) triglycerides is preferably maximized in these reduced calorie fats. Conversely, to avoid undesirable waxiness, the level of di-long chain (LLM and LML and LLS and LSL) triglycerides, as well as the level of tri-long chain (LLL) triglycerides, in these reduced calorie fats is preferably minimized.

Preferred reduced calorie fats for use in the chocolate confectionery compositions of the present invention are described in Seiden; U.S. Pat. No. 5,288,512; Issued Feb. 22, 1994 (herein incorporated by reference) and in Wheeler et al; U.S. Pat. No. 5,258,197; Issued Nov. 2, 1993 (herein incorporated by reference).

These reduced calorie fats can be synthesized by a wide variety of techniques such as:

(a) random rearrangement of tribehenin and medium chain or short chain triglycerides having the desired saturated fatty acids;

(b) esterification of glycerol with a blend of the corresponding fatty acids;

(c) transesterification of a blend of medium or short chain saturated fatty acid methyl esters and behenic fatty acid methyl esters with glycerol;

(d) transesterification of glycerol behenate with medium chain or short chain triglycerides having the desired saturated fatty acids;

(e) esterification of a long chain fatty acid monoglyceride with short chain or medium chain fatty acids; and (f) esterification of long chain fatty acid monoglycerides with short or medium chain fatty acid anhydrides.

Random rearrangement of triglycerides is well known in the art, as is the esterification of glycerol with fatty acids. For discussions on these subjects, see Hamilton et al., *Fats and Oils: Chemistry and Technology* pp. 93–96, Applied Science Publishers Ltd., London (1980), and Swern, *Bailey's Industrial Oil and Fat Products*, 3d ed., pp. 941–943 and 958–965 (1964), which are incorporated by reference. Transesterification is also discussed generally in Bailey's at pp. 958–963. Esterification of long chain fatty acid monoglycerides with medium chain fatty acids or medium chain fatty acid anhydrides is discussed in U.S. Pat. Nos. 5,142,071 and 5,142,072 (both of which are herein incorporated by reference) to Kluesener et al and Stipp et al, respectively, on Aug. 25, 1992.

Fatty acids per se or naturally occurring fats and oils can serve as sources of fatty acids for preparing the reduced calorie fats. For example, hydrogenated high erucic acid rapeseed oil is a good source of behenic acid. Medium chain $C_8/C_{10}$ saturated fatty acids can be obtained from coconut, palm kernel, or babassu oils. They can also be obtained from commercial medium chain triglycerides, such as the Captex 300 brand sold by Capital City Products, of Columbus, Ohio. Short chain saturated fatty acids can be derived from dairy butterfat, coconut oil or palm kernel oil.

Tribehenin, useful for making the present reduced calorie triglycerides, can be prepared from behenic acid or from fractionated methyl behenate by esterification of the acid, or by transesterification of methyl behenate with glycerol. More importantly, blends of behenic acid and medium chain $C_8/C_{10}$ saturated fatty acids or short chain saturated fatty acids can be esterified with glycerol. Similarly, methyl ester blends can also be interesterified with glycerol.

The crude triglyceride mixture resulting from synthesis is typically modified by additional fractionation to provide higher levels of mono-long chain MLM and MML or SLS and SSL triglycerides in the reduced calorie fats. Solvent and non-solvent crystal fractionation or fractional distillation methods (e.g. molecular distillation as described below) can be used. Standard fractionation methods are discussed in Applewhite, *Bailey's Industrial Oil and Fat Products*, Vol. 3, 4th ed. (1985), pp. 1–39, John Wiley & Sons, New York, which is incorporated by reference. Molecular distillation can separate MML/MLM from LLM/LML triglycerides or SSL/SLS from LLS/LSL triglycerides, and can shift the carbon number concentration, but it cannot fractionate triglycerides having the same carbon number. Non-solvent or solvent crystal fractionation can also fractionate MLM/MML or SLS/SSL triglycerides from the higher melting LLM/LML or LLS/LSL triglycerides. The molecular distillation or crystal fractionation of the crude triglyceride mixture is usually repeated several times to increase the level of desired MLM/MML or SLS/SSL triglycerides in these reduced calorie fats.

Fractional distillation of the crude triglyceride mixture is not limited to molecular distillation, but can also include conventional distillation (continuous or batch). After synthesis of the crude triglyceride mixture, it is common to use a conventional batch distillation technique to remove most of the excess medium chain triglycerides, and then continue with molecular distillation. The vacuum requirements are not as strict, and the temperature used can be higher in conventional distillation versus molecular distillation. The conventional distillation temperature is generally between 405° F. (207° C.) and 515° F. (268.3° C.). The absolute pressure is less than 8 mm Hg, more preferably less than 2 mm Hg. The distillation is aided by sparging with steam, nitrogen or other inert gas (e.g., $CO_2$). The distillation is carried out to remove part of the excess medium or short chain triglycerides, most of the excess medium or short chain fatty acids, or to distill also the mono-long chain (MLM and MML or SLS and SSL) components.

Crystal fractionation of the distilled triglyceride mixture can be carried out with and without solvents, with and without agitation. The crystal fractionation can be repeated several times. Crystal fractionation is particularly effective to remove high melters. Fractionation of the distilled triglyceride mixture without solvents can be used to remove LLM and LML or LLS and LSL components, which in turn alters the melting profile of these reduced calorie fats.

2. Milk Fat and Cocoa Butter

The fat component can tolerate up to certain levels of milk fat and cocoa butter. Milk fat (sometimes preferred to as "butterfat") is usually present in the fat component as the result of the inclusion of milk solids in milk chocolate-flavored confectionery compositions. However, milk fat can also be present as the result of the inclusion of butter oil. Milk fat can generally be tolerated in the fat component at levels up to about 15%. For milk chocolate-flavored compositions that optionally contain cocoa butter, milk fat is typically present in the fat component at a level of from about 3 to about 14%, and preferably at a level of from about 3 to about 12%.

The cocoa butter present in the fat component can be included as an added fat. However, cocoa butter is more typically included as a result of its being present in the source of chocolate flavoring (e.g., cocoa powder, chocolate liquor, or more typically blends thereof) used in the chocolate confectionery composition. Cocoa butter can generally be tolerated in the fat component at levels up to about 20%. Cocoa butter is typically present in the fat component at a level of from about 1 to about 14%, and more preferably at a level of from about 3 to about 12%.

3. Diglycerides and Other Confectionery Fats

The reduced calorie fat typically contributes most, if not all, of the diglycerides present in the fat component. However, other fats present in the fat component can also contribute a certain portion of diglycerides. For bloom resistance of the chocolate confectionery composition, it is particularly important to minimize the level of diglycerides in the fat component. Up to about 4% diglycerides can be tolerated in the fat component. Preferably, the level of diglycerides in the fat component is no more than about 2%, more preferably no more than about 1%, and most preferably no more than about 0.5%.

In addition to the reduced calorie fat, milk fat, and cocoa butter, the fat component of the present invention can comprise other compatible confectionery fats. These compatible confectionery fats include cocoa butter substitutes derived from illipe butter (Borneo allow), Shea butter, Mowrah fat and palm oil. Suitable cocoa butter substitutes derived from palm oil are the POP fats disclosed in U.S. Pat. No. 4,594,259 to Baker et at, issued Jun. 10, 1986, which is incorporated by reference. These cocoa butter substitute fats can be included as partial or total replacements for the cocoa butter present in the fat component. However, because of their higher caloric value, these cocoa butter substitute fats are typically not included in the fat component.

C. Other Nonfat Confectionery Ingredients

1. Sugars, Sugar Alcohols, and Reduced Calorie Sweeteners

One particularly important nonfat ingredient in these chocolate confectionery compositions is sugar. Sugar is typically present in such compositions at from about 35 to about 60%, and preferably at from about 40 to about 55%, of the composition. Sources of sugar include sucrose, fructose, glucose, maltose and mixtures thereof. The sugar typically has a particle size in the range of from about 0.0002 to about 0.0016 inches (from about 5 to about 40 microns) in the finished chocolate product.

For dietary reasons, the sugar can be completely or partially substituted with a sugar alcohol. Suitable sugar alcohols include sorbitol, xylitol, mannitol and mixtures thereof. For further calorie reduction, the sugar or sugar alcohol can be completely or partially substituted with a reduced calorie sweetener. These reduced calorie sweeteners include, but are not limited to, Aspartame, saccharin, alitame, thaumatin, dihydrochalcones, cyclamates, steviosides, glycyrrhizins, synthetic alkoxy aromatics, such as Dulcin and P-4000, sucrolose, suosan, miraculin, monellin, talin, cyclohexylsulfamates. substituted imidazolines, synthetic sulfamic acids such as acesulfame, acesulfam-K and n-substituted sulfamic acids, oximes such as perilartine, rebaudioside-A peptides such as aspartyl malonates and succanilic acids, dipeptides, amino acid based sweeteners such as gem-diaminoalkanes, meta-aminobenzoic acid, L-aminodicarboxylic acid alkanes, and amides of certain alphaaminodicarboxylic acids and gem-diamines, and 3-hydroxy 1 alkyloxphenyl aliphatic carboxylates or heterocyclic aromatic carboxylates. When these reduced calorie sweeteners are used, it can be desirable to include bulking or bodying agents. Suitable bulking agents include nondigestible carbohydrates, for example, polydextrose.

2. Milk Solids

Especially in milk chocolate compositions, the chocolate confectionery composition can also include milk solids (essentially dry), usually at from about 9 to about 20% of the composition, and typically at from about 12 to about 18%. Suitable sources of essentially dry milk solids can be obtained from cream, milk, concentrated milk, sweetened condensed milk, skim milk, sweetened condensed skim milk, concentrated buttermilk, and the like. (As previously stated, any fat present in the milk solids, such as milk fat, is considered part of the fat component.)

3. Emulsifiers and Other Minor Ingredients

Flavored confectionery compositions usually include an emulsifier to "wet" the sugar panicles with the fat component. Suitable emulsifiers include sorbitan monostearate, polysorbate 60, polyglycerol esters, sucrose partial esters, and particularly lecithin. These emulsifiers are usually present at up to about 1.5% of the composition, and typically at up to about 0.5%. Preferred levels of emulsifier are from about 0.05 to about 0.5%. Other minor ingredients such as salt normally present in fat-based confections can be included, as well as optional components, such as the pharmaceutical actives disclosed at column 7, lines 1–35 of U.S. Pat. No. 4,786,502 to Chapura et al., issued Nov. 22, 1988, which is incorporated by reference.

The chocolate confections utilized in the present invention also preferably contain tribehenin to control crystal growth during processing which results in higher gloss, prevents "hot spot" bloom and ensures good bloom stability during commercial storage and distribution. Tribehenin is typically added at levels of from about 0.1% to about 2.0%.

Untempered chocolate confectionery compositions useful in the process of the present invention can be prepared as described in U.S. Pat. Nos. 4,888,196 and 5,023,106 to Ehrman et at; Issued on Dec. 19, 1989 and Jun. 11, 1991, respectively and in U.S. Pat. No. 5,275,835; Issued Jan. 4, 1994 to Masterson et al.

II. Heating and Cooling the Chocolate Confectionery Compositions

The untempered chocolate confectionery compositions are heated to a temperature ranging from about 37.8° C. (100° F.) to about 65.5° C. (150° F.) to form a melt. The melt is then adjusted to a temperature ranging from about 29.4° C. (85° F.) to about 48.9° C. (120° F.), more preferably from about 32.2° C. (90° F.) to about 37.8° C. (100° F.), most preferably from about 32.2° C. (90° F.) to about 35° C. (95° F.). The particular temperature selected for the untempered chocolate at this point in the process is the lowest temperature possible without forming crystals or causing nucleation.

III. Filling the Bar Moulds

Next, bar moulds are filled with the untempered chocolate confections.

IV. Removing Air Bubbles

Once the bar moulds have been filled with the untempered chocolate, steps are taken to remove air bubbles from the chocolate. The presence of air bubbles can lead to a bubbly surface which is undesirable in appearance and which can negatively impact the ability to demould to chocolate confectionery product. Air bubbles also reduce the glossy appearance of the chocolate. The air bubbles can be removed by conventional means such as by mechanical vibration. Typically, air bubbles are removed by mechanically vibrating the moulds for from about 2 to about 60 seconds.

V. Cooling the Bar Moulds

After substantially all of the air bubbles have been removed as hereinbefore described, the moulds containing the chocolate confections are rapidly cooled to temperatures sufficiently low to achieve a chocolate/mould interface temperature of less than about 22.2° C. (72° F.). Preferably, the mould containing the chocolate is cooled to a temperature sufficiently low to achieve a chocolate/mould interface temperature of less than about 20° C. (68° F.), even more preferably less than about 4.4° C. (40° F.) and most preferably less than about −6.6° C. (20° F.). In general, the lower the chocolate/mould interface temperature during this process step, the higher the attainable product gloss and the higher the possible intermediate storage temperature. Coolant temperatures to achieve these chocolate/mould interface temperatures need to be less than about 4.4° C. (40° F.), preferably less than about −6.6° C. (20° F.), more preferably less than about −23.2° C. (−10° F.), and most preferably less than about −45.6° C. (−50° F.) (blast freezer temperature).

It is especially important that the cooling of the moulds containing the chocolate be done very rapidly. Rapid cooling allows many small alpha nuclei to form which allows for a high gloss product. Slow cooling forms large alpha nuclei which imparts less gloss. Very slow cooling allows beta-prime nuclei to form which leads to bloom formation. In particular, the chocolate/mould interface temperatures hereinbefore described are preferably reached in less than about 5 minutes, preferably in less than about 1 minute, more preferably less than about 30 seconds and most preferably less than about 15 seconds.

VI. Holding

Once the desired chocolate/mould interface temperature is reached, the mould containing the chocolate is held at that temperature for from about 0 to about 15 minutes, preferably from about 1 to about 10 minutes, more preferably from about 1 to about 5 minutes.

After the desired amount of time, the moulds are tapped to release the bars from the moulds. The chocolate confection is typically maintained within a temperature range of from about 4.4° C. (40° F.) to about 22.2° C. (72° F.), preferably from about 4.4° C. (40° F.) to about 20° C. (68° F.), most preferably from about 4.4° C. (40° F.) to about 18.3° C. (65° F.) and at a humidity of from about 0% to about 30% for a time period ranging from about 1 to about 24 hours, so that excessive softening will not occur. Final storage is at a temperature of 21.1 ° C. (70° F.) or higher.

Products prepared according to this process will have acceptable gloss and desirable organoleptic properties.

ANALYTICAL METHODS

Fatty Acid Composition

The fatty acid composition of the triglycerides present in the reduced calorie fat is measured by gas chromatography. First, fatty acid ethyl esters of the triglycerides are prepared by any standard method (e.g., by transesterification using sodium ethoxide), and then separated on a capillary column which is coated with DB-WAX stationary phase. The fatty acid ethyl esters are separated by chain length and degree of unsaturation. A split injection is made with flame ionization detection. Quantitation is performed by use of a double internal standard method. This method can separate fatty acid ethyl esters from $C_6$ to $C_{24}$.

| Equipment | |
|---|---|
| Gas Chromatograph | Hewlett-Packard 5890, or equivalent, equipped with a split injector and flame ionization detector, Hewlett-Packard Co., Scientific Instruments Div., 1601-T California Ave., Palo Alto, CA 94304 |
| Autosampler | Hewlett-Packard 7673 A, or |
| Injector column | equivalent |
| Column | 15 m × 0.25 mm I.D., fused silica capillary column coated with DP-WAX (0.25 micron film thickness), Hewlett-Packard Co., Scientific Instruments Div. |
| Data System | Hewlett-Packard 3350, 3000-T Hanover St., Palo Alto, CA 94304 |
| Recorder | Kipp & Zonen, 13D40, Kipp Zonen |
| Reagent | |
| Hexane | Burdick & Jackson, or equivalent, American Scientific Products |

Reference Standards

Two reference standards are used each day of operation to verify proper operation of this method. (1) A reference mixture of fatty acid methyl esters (FAME) is used to check the operation of the instrument. This reference mixture has the following fatty acid composition: 19% $C_{14:0}$, 4% $C_{16:0}$, 3% $C_{18:0}$, 45% $C_{18:1}$, 15% $C_{18:2}$, 3% $C_{18:3}$, 3% $C_{20:0}$, 3% $C_{22:0}$, 20% $C_{22:1}$, and 3% $C_{24:0}$. (2) A reference standard of a commercial shortening is used to check the operation of the total system—ethylation and gas chromatographic analysis. The shortening reference standard has the following fatty acid composition: 0.5% $C_{14:0}$, 21.4% $C_{16:0}$, 9.2% $C_{18:0}$, 40.3% $C_{18:1}$, 23.0% $C_{18:2}$, 2.2% $C_{18:3}$, 0.4% $C2_{0:0}$, 1.3% $C_{20:1}$ and 0.3% $C_{22:0}$.

The reference mixture of FAME should be diluted hexane and then injected into the instrument. A new Vial of FAME reference mixture should be opened every day since the highly unsaturated components, $C_{18:2}$ and $C_{18:3}$, oxidize easily. The shortening reference standard should be ethylated with the samples prior to their analysis by capillary gas chromatography. The results from the reference standards should be compared with the known values and a judgment made concerning the completed analysis. If the results of the reference standards are equal to or within ± standard deviations of the known values, then the equipment, reagents and operations are performing satisfactorily.

OPERATION

A. Instrumental Set-up

1. Install the column in the gas chromatograph, and set up the instrumental conditions as in Table 4.
2. Set up the data system with the appropriate method to acquire and analyze the data. The retention times may have to be adjusted in the method due to instrument variations. Consult the data system reference manual on how to do this—HP3350 User's Reference Manual. Unity response factors are used for each component.
3. Obtain the shortening reference standard for analysis with the samples and ethylate it with the samples.

TABLE 4

| INSTRUMENTAL CONDITIONS | |
|---|---|
| Instrument Column | Hewlett-Packard 5890 15 m × 0 25 mm I.D., coated with DB-WAX, 0.25µ film thickness |
| Column head pressure | 12.5 psi |
| Carrier gas | Helium |
| Injector "A" temperature | 210° C. |
| Split vent flow | 100 mL/min. |
| Septum purge | 1.5 mL/min. |
| Oven temperature profile: | |
| Initial temperature | 110° C. |
| Initial time | 1 min. |
| Rate 1 | 15° C./min. |
| Final temp 1 | 170° C. |
| Final time 1 | 0 min. |
| Rate 2 | 6° C./min. |
| Final temp 2 | 200° C. |
| Final time 2 | 0 min. |
| Rate 3 | 10° C./min. |
| Final temp 3 | 220° C. |
| Final time 3 | 3 min. |
| Detector | FID |
| Detector temp | 230° C. |
| Make-up gas | 30 mL/min. |
| Detector H2 flow | 30 mL/min. |
| Detector air flow | 300 mL/min. |

B. Analysis of Samples—(The samples are analyzed with a double internal standard.)

1. Dilute the reference mixture of FAME with hexane. The methyl esters should be approximately 2% in hexane. Inject one microliter of this solution via the autosampler. The results must meet the criteria in the Reference Standards section.
2. Prepare the triglyceride samples to be analyzed by adding two different internal standards, $C_9$ and $C_{21}$ triglycerides. ($C_9$ and $C_{21}$ triglycerides are commercial standards consisting of 100% 9-carbon and 21-carbon triglycerides, respectively.) The internal standards are added to the samples at about 10% by weight of the sample. The samples (including the internal standards) are then converted to ethyl esters by any standard method.
3. Set up a sequence in the LAS data system to inject the samples.
4. Activate the autosampler to inject 1.0 microl. of the samples in the sequence. The gas chromatograph will automatically begin its temperature program and the data system will collect and analyze the data for the sequence.
5. The data is analyzed with the two internal standard procedure. The absolute amount (mg of esters per gram of sample) of the $C_6$ through $C_{16}$ components is calculated from the $C_9$ internal standard. The absolute amount of the $C_{18}$, $C_{20}$, $C_{22}$ and $C_{24}$ components is calculated from the $C_{21}$ internal standard. Weight percentages of fatty acids are calculated from these amounts.

EXAMPLES

The following are specific illustrations of the process of the present invention:

EXAMPLE I

A chocolate-confectionery composition is formulated from the following ingredients:

| Ingredient | Amount (g.) |
|---|---|
| Reduced calorie fat | 1130.7 |
| Chocolate liquor | 152.0 |
| Lecithin | 4.0 |
| cocoa powder (10–12% fat) | 208.0 |
| Whole milk solids (26% fat) | 388.0 |
| Nonfat milk solids | 140.0 |
| Vanillin | 2.0 |
| Sucrose | 1948.0 |

The reduced calorie fat used in this chocolate confectionery composition is prepared generally as follows: Compritol 888 (a mixture of approximately 25% monobehenin, 50% dibehenin and 25% tribehenin, sold by Gattefosse of 200 Sawmill River Road, Hawthorne, N.Y.) is further esterified at 265° C. with capric fatty acid until the diglyceride concentration of the mixture is reduced to less than 4%. The weight ratio of Compritol 888 to capric fatty acid at the start of esterification is 70:30. The resulting esterified mixture is deodorized at 260° C. for 3 hours and then combined with Captex 355 (a mixture of $C_8/C_{10}$ medium chain triglycerides, sold by Capital City Products, of Columbus, Ohio) in a weight ratio of 58:42. This mixture is randomly rearranged (randomized) at a temperature of 80° C. for 20 minutes using 0.06% sodium methoxide as the catalyst, neutralized with phosphoric acid and then filtered to remove sodium phosphate. The randomized mixture (approximately 2.5% diglycerides, 38.5% medium chain (MMM) triglycerides, 43.5% mono-long chain (MLM/MML) triglycerides, 13.5% di-long chain (LLM/LML) triglycerides, and 1% tri-long chain (LLL) triglycerides), is steam stripped at a temperature of 450° F. to 515° F. (232.2° to 268.3° C.) during which a major portion of the medium chain triglycerides are distilled off. The stripped residue (2.5% diglycerides, 6% medium chain triglycerides, 67% mono-long chain triglycerides, and 24% di-long chain triglycerides) is then passed three times at gradually increasing temperatures through two 14 inch molecular stills (connected in series) to increase the level of mono-long chain triglycerides. The molecular stills are operated under the following conditions:

Bell jar pressure: 5–11 microns Hg. abs.
Rotor feed temperature: 125°–160° C.
Rotor residue temperature: 180°–216° C.
Initial feed pump rate: 36 lbs./hour
Distillation rate: 4–6 lbs./hour per unit The distillate fractions obtained (total of 25) contain 1% medium chain triglycerides, 92% mono-long chain triglycerides, and 5–6% di-long chain triglycerides. Each of these distillate fractions are subjected to nonsolvent fractionation, first at 80° F. (26.7° C.) and then at 76° F. (24.4° C.).

The chocolate-flavored molding composition is processed in two batches of equal size. The cocoa powder, whole milk solids, nonfat milk solids, vanillin and sucrose are blended, and then the melted chocolate liquor is added along with 720.8 g. of the reduced calorie fat. After blending, this mixture is refined twice using a Lehman Four-Roll Refiner (200 psi NIP pressure). This refined mix (3381.4 g.) is dry conched 2½ to 3 hours at 145° F. (62.8° C.) using a Hobart C-100 Mixer set at speed #2. An additional 257.4 g of reduced calorie fat is added, and the temperature of the mix is then reduced to 125° F. (51.7° C.). The mix is then wet-conched at speed #1 for 17 hours.

Finally, the remaining reduced calorie fat (152.5 g.) and lecithin is added to this chocolate-flavored mixture and blended thoroughly for about 45 minutes.

(A) The chocolate-flavored mixture is heated, while being agitated in a Hobart C-100 Mixer at speed #2, to about 48.9° C. (120° F.) to form a melt. The temperature is then reduced to about 32.2° C. (90° F.) and, after equilibration, the chocolate-flavored mass is poured into bar moulds of about 42.6 g portions.

The mould is then placed in a blast freezer at about −56° C. (−70° F.) for about 5 minutes (mould/chocolate surface temperature was −6.6° C. (20° F.)). Afterwards, the chocolate samples are de-moulded and placed at an intermediate storage temperature of 4.4° C. (40° F.) for about 16 hours. Thereafter, the bar is then moved to a 21.1° C. (70° F.) room for final storage.

(B) The chocolate-flavored mixture is heated, while being agitated in a Hobart C-100 Mixer at speed #2, to about 48.9° C. (120° F.) to form a melt. The temperature is then reduced to about 32.2° C. (90° F.) and, after equilibration, the chocolate-flavored mass is poured into bar moulds of about 42.6 g portions.

The mould is then placed in a blast freezer at about −56° C. (−70° F.) for about 5 minutes (mould/chocolate surface temperature was −6.6° C. (20° F.)). Afterwards, the chocolate samples are de-moulded and placed at an intermediate storage temperature of 18.3° C. (65° F.) for about 16 hours. Thereafter, the bar is then moved to a 21.1° C. (70° F.) room for final storage.

(C) The chocolate-flavored mixture is heated, while being agitated in a Hobart C-100 Mixer at speed #2, to about 48.9° C. (120° F.) to form a melt. The temperature is then reduced to about 90° F. (32.2° C.) and, after equilibration, the chocolate-flavored mass is poured into bar moulds of about 42.6 g portions.

The mould is then placed in a blast freezer at about −56° C. (−70° F.) for about 5 minutes (mould/chocolate surface temperature was −6.6° C. (20° F.)). Afterwards, the chocolate samples are de-moulded and placed at an intermediate storage temperature of 21.1° C. (70° F.) for about 16 hours. Thereafter, the bar is then moved to a 21.1° C. (70° F.) room for final storage.

(D) The chocolate-flavored mixture is heated, while being agitated in a Hobart C-100 Mixer at speed #2, to about 48.9° C. (120° F.) to form a melt. The temperature is then reduced to about 90° F. (32.2° C.) and, after equilibration, the chocolate-flavored mass is poured into bar moulds of about 42.6 g portions.

The mould is then placed in a blast freezer at about −45.6° C. (−50° F.) for about 3 minutes (mould/chocolate surface temperature was 4.4° C. (40° F.). Afterwards, the chocolate samples are de-moulded, wrapped and placed at an intermediate storage temperature of 4.4° C. (40° F.) for about 16 hours. Thereafter, the bar is then moved to a 21.1° C. (70° F.) room for final storage.

E) The chocolate-flavored mixture is heated, while being agitated in a Hobart C-100 Mixer at speed #2, to about 48.9° C. (120° F.) to form a melt. The temperature is then reduced to about 90° F. (32.2° C.) and, after equilibration, the chocolate-flavored mass is poured into bar moulds of about 42.6 g portions.

The mould is then placed in a blast freezer at about −45.6° C. (−50° F.) for about 3 minutes (mould/chocolate surface temperature was 4.4° C. (40° F.)). Afterwards, the chocolate samples are de-moulded, wrapped and placed at an intermediate storage temperature of 4.4° C. (40° F.) for about 16 hours. Thereafter, the bar is then moved to a 21.1° C. (70° F.) room for final storage.

(F) The chocolate-flavored mixture is heated, while being agitated in a Hobart C-100 Mixer at speed #2, to about 48.9° C. (120° F.) to form a melt. The temperature is then reduced to about 90° F. (32.2° C.) and, after equilibration, the chocolate-flavored mass is poured into bar moulds of about 42.6 g portions.

The mould is then placed in a blast freezer at about −45.6° C. (−50° F.) for about 3 minutes (mould/chocolate surface temperature was 4.4° C. (40° F.)). Afterwards, the chocolate samples are de-moulded, wrapped and placed at an intermediate storage temperature of 4.4° C. (40° F.) for about 16 hours. Thereafter, the bar is then moved to a 21.1° C. (70° F.) room for final storage.

NOTE: Example (A) had the best gloss.

NOTE: No tribehenin was used in any of these eight samples.

EXAMPLE 2

A chocolate confectionery molding composition is formulated from the following ingredients:

| Ingredient | Amount (g.) |
| --- | --- |
| Reduced calorie fat* | 320.8 |
| Chocolate liquor | 55.1 |
| Lecithin | 0.6 |
| Cocoa powder (10–12% fat) | 61.2 |
| Whole milk solids (26% fat) | 172.8 |
| Vanillin | 0.6 |
| Sucrose | 579.6 |

*Same as Example I

The cocoa powder, whole milk solids, vanillin and sucrose is blended, and then 216.1 g. of melted reduced calorie fat is added. This mixture is passed through the Lehman Four-Roll refiner (200 psi NIP pressure) twice. The melted chocolate liquor is added to the refined mix (988.1 g.) and then dry conched at 140° F. (60° C.) for 3 hours using a C-100 Hobart mixer set at speed #2. The temperature of the mix is then reduced to 120° to 125° F. (48.9° to 51.7° C.). Lecithin and more reduced calorie fat (50.0 g.) are added, and then the mix is wet conched for 16 hours at speed #1.

An additional 54.7 g. of reduced calorie fat is then added to the wet-conched mixture. The chocolate is then processed according to any one of (A) through (F) set forth in Example I.

EXAMPLE 3

A reduced calorie flavored confectionery composition is prepared using the following ingredients:

| | Ingredients |
|---|---|
| chocolate liquor (52% cocoa butter) | 0.33 parts |
| cocoa powder (11% cocoa butter) | 7.64 parts |
| whole fat milk solids (26% butterfat) | 3.56 parts |
| nonfat milk solids (0.8% butterfat) | 8.92 parts |
| ethyl vanillin | 0.06 parts |
| soy lecithin | 0.44 parts |
| reduced calorie confectionery fat | 33.69 parts |
| sucrose | 55.56 parts |

The reduced calorie confectionery fat ingredient is prepared by esterifying monobehenin with caprylic and capric fatty acids according to the process described in U.S. Pat. No. 5,142,071; Issued Aug. 25, 1992. This reduced calorie fat has the following triglyceride and fatty acid composition:

| | % |
|---|---|
| Triglycerides* | |
| $C_{24}$–$C_{30}$ | 0.2 |
| $C_{32}$–$C_{34}$ | 0.7 |
| $C_{36}$–$C_{44}$ | 98.3 |
| >$C_{44}$ | 0.7 |
| FAC** | |
| $C_{8:0}$/$C_{10:0}$ | 49.9 |
| $C_{12:0}$/$C_{14:0}$/$C_{16:0}$ | 0.3 |
| $C_{18:0}$/$C_{18:1}$/$C_{18:2}$ | 0.5 |
| $C_{20:0}$ | 1.2 |
| $C_{22:0}$ | 47.0 |
| $C_{22:1}$ | 0.1 |
| $C_{24:0}$ | 0.8 |

*by CNP, $C_{24}$–$C_{30}$ = MMM; $C_{32}$–$C_{34}$ = MML/MLM/other $C_{36}$–$C_{44}$ = MML/MLM > $C_{44}$ = LLM/LML/other
**Fatty Acid Composition To make a reduced calorie flavored confectionery composition from the above ingredients.

1. Mix the dry ingredients (cocoa powder, whole milk solids, nonfat dry milk solids, ethyl vanillin, sucrose) at low speed.
2. Add melted chocolate liquor to the dry ingredients. Continue to mix at low speed.
3. Add 25.91 parts of the reduced calorie confectionery fat (previously melted) to the mixture. Continue mixing at the low speed until all of the ingredients are well blended.
4. Refine the mixture with a roll-mill.
5. Weight out 91.78 parts of the amount of mix recovered from the mill. Dry-conch at 140°–145° F. (60°–62.8° C.) for 2.5 to 3 hours at medium speed.
6. Add 7.78 parts of melted reduced calorie confectionery fat to the dry-conched mix. Add the soy lecithin. Mix well. Reduce the temperature to 120°–125° F. (48.9°–51.7° C.). Reduce the mixer speed to low and continue wet-conching overnight (16 to 20 hours).

With these ingredients and procedure, a reduced calorie flavored confectionery composition with the following composition is prepared:

| | Composition |
|---|---|
| chocolate liquor (52% cocoa butter) | 0.30% |
| cocoa powder (11% cocoa butter) | 6.88% |
| whole fat milk solids (26% butterfat) | 3.20% |
| nonfat milk solids (0.8% butterfat) | 8.03% |
| ethyl vanillin | 0.05% |
| soy lecithin | 0.44% |
| reduced calorie confectionery fat | 31.10% |
| sucrose | 50.00% |

This composition can then be processed according to any one of (A) through (F) set forth in Example I.

EXAMPLE 4

A reduced calorie flavored confectionery composition is prepared according to Example 3, except that the reduced calorie confectionery ingredient is prepared according to any of Example 1–20 of Wheeler et al; U.S. Pat. No. 5,258,197; Issued Nov. 2, 1993.

What is claimed is:

1. A process for reducing the in-mould time required for preparing chocolate confectionery products, which process comprises the steps of:
   (I) forming an untempered chocolate confectionery composition which contains a reduced calorie fat;
   (II) heating the untempered chocolate confectionery composition to a temperature ranging from about 37.8° C. to about 65.5° C. to form a melt and then adjusting the temperature of the melt to a temperature ranging from about 29.4° C. to about 48.9° C.;
   (III) filling bar moulds with the untempered chocolate confectionery composition;
   (IV) removing air bubbles from the chocolate confectionery composition;
   (V) rapidly cooling the bar moulds containing the chocolate confectionery composition to a temperature sufficiently low so that the chocolate confectionery composition/mould interface temperature is less than about 22.2° C.; and
   (VI) holding the bar mould containing the chocolate confectionery composition at a temperature of less than about 22.2° C. for from about 0 to about 15 minutes.

2. A process according to claim 1 wherein after step (VI) the chocolate confectionery composition is maintained within a temperature range of from about 4.4° C. to about 22.2° C. and at a humidity of from 0% to about 30% for a time period ranging from about 1 to about 24 hours.

3. A process according to claim 2 wherein in step (V) the bar moulds containing the chocolate confectionery composition are cooled to a temperature sufficiently low so that the chocolate confectionery composition/mould interface temperature is less than about 20° C.

4. A process according to claim 3 wherein in step (VI) the mould containing the chocolate confectionery composition is held at a temperature of less than about 15.4° C. for from about 1 to about 10 minutes.

5. A process according to claim 4 wherein in step (V) the bar moulds containing the chocolate confectionery composition are cooled to a temperature sufficiently low so that the chocolate confectionery composition/mould interface temperature is less than about 4.4° C.

6. A process according to claim 5 wherein in step (VI) the mould containing the chocolate confectionery composition is held at a temperature of less than about 4.4° C. for from about 1 to about 5 minutes.

7. A process according to claim 1 wherein untempered chocolate confectionery composition comprises:
a. a flavor enhancing amount of a flavor component;
b. from about 25 to about 45% of a fat component comprising:
(1) at least about 70% of a reduced calorie fat having:
(a) at least about 85% combined MLM and MML triglycerides;
(b) no more than about 5% combined LLM and LML triglycerides;
(c) no more than about 2% LLL triglycerides;
(d) no more than about 4% MMM triglycerides;
(e) no more than about 7% other triglycerides;
wherein M is a $C_6$ to $C_{10}$ saturated fatty acid residue and L is a $C_{20}$ to C24 saturated acid residue;
(f) a fatty acid composition having:
(i) from about 40 to about 60% combined $C_8$ and $C_{10}$ saturated fatty acids,
(ii) a ratio of $C_8$ to $C_{10}$ saturated fatty acids of from about 1:2.5 to about 2.5:1,
(iii) from about 40 to about 60% behenic fatty acid,
(2) up to about 15% milk fat;
(3) up to about 20% cocoa butter;
(4) no more than about 4% diglycerides; and
c. from about 55 to about 75% other nonfat confectionery ingredients.

8. A process according to claim 7 wherein after step (VI) the chocolate confectionery composition is maintained within a temperature range of from about 4.4° C. to about 22.2° C. and at a humidity of from 0% to about 30% for a time period ranging from about 1 to about 24hours.

9. A process according to claim 8 wherein in step (V) the bar moulds containing the chocolate confectionery composition are cooled to a temperature sufficiently low so that the chocolate confectionery composition/mould interface temperature is less than about 20° C.

10. A process according to claim 9 wherein in step (VI) the mould containing the chocolate confectionery composition is held at a temperature of less than about 20° C. for from about 1 to about 10 minutes.

11. A process according to claim 10 wherein in step (V) the bar moulds containing the chocolate confectionery composition are cooled to a temperature sufficiently low so that the chocolate confectionery composition/mould interface temperature is less than about 4.4° C.

12. A process according to claim 11 wherein in step (VI) the mould containing the chocolate confectionery composition is held at a temperature of less than about 4.4° C. for from about 1 to about 5 minutes.

13. A process according to claim 1 wherein the untempered chocolate confectionery composition comprises:
a. a flavor enhancing amount of a flavor component;
b. from about 25 to about 45% of a fat component comprising:
(1) at least about 70% of a reduced calorie fat containing at least about 25% of a mixture of SSL, SLS, LLS and LSL having at least about 75% combined SLS and SSL triglycerides and from about 0.1 to about 10% combined LLS and LSL triglycerides, with from about 10 to about 25% acetic acid residues and from 01. to 10% residues of propionic acid, butyric acid or a mixture of propionic and butyric acid in the total mixture; wherein S=a short chain fatty acid residue selected from propionic acid, butyric acid and acetic acid and L=a long chain fatty acid selected from C18 to C22 saturated fatty acids
(2) up to about 15% milk fat;
(3) up to about 20% cocoa butter;
(4) no more than about 4% diglycerides; and
c. from about 55 to about 75% other nonfat confectionery ingredients.

14. A process according to claim 13 wherein after step (VI) the chocolate confectionery composition is maintained within a temperature range of from about 4.4° C. to about 22.2° C. and at a humidity of from 0% to about 30% for a time period ranging from about 1 to about 24 hours.

15. A process according to claim 14 wherein in step (V) the bar moulds containing the chocolate confectionery composition are cooled to a temperature sufficiently low so that the chocolate confectionery composition/mould interface temperature is less than about 20° C.

16. A process according to claim 15 wherein in step (VI) the mould containing the chocolate confectionery composition is held at a temperature of less than about 20° C. for from about 1 to about 10 minutes.

17. A process according to claim 16 wherein in step (V) the bar moulds containing the chocolate confectionery composition are cooled to a temperature sufficiently low so that the chocolate confectionery composition/mould interface temperature is less than about 4.4° C.

18. A process according to claim 17 wherein in step (VI) the mould containing the chocolate confectionery composition is held at a temperature of less than about 4.4° C. for from about 1 to about 5 minutes.

19. A process for reducing the in-mould time required for preparing chocolate confectionery products, which process comprises the steps of:
(I) forming an untempered chocolate confectionery composition which comprises:
a. a flavor enhancing amount of a flavor component;
b. from about 25 to about 45% of a fat component comprising:
(1) at least about 70% of a reduced calorie fat having:
(a) at least about 85% combined MLM and MML triglycerides;
(b) no more than about 5% combined LLM and LML triglycerides;
(c) no more than about 2% LLL triglycerides;
(d) no more than about 4% MMM triglycerides;
(e) no more than about 7% other triglycerides;
wherein M is a $C_6$ to $C_{10}$ saturated fatty acid residue and L is a $C_{20}$ to $C_{24}$ saturated acid residue;
(f) a fatty acid composition having:
(i) from about 40 to about 60% combined $C_8$ and $C_{10}$ saturated fatty acids,
(ii) a ratio of $C_8$ to $C_{10}$ saturated fatty acids of from about 1:2.5 to about 2.5:1,
(iii) from about 40 to about 60% behenic fatty acid,
(2) up to about 15% milk fat;
(3) up to about 20% cocoa butter;
(4) no more than about 4% diglycerides; and
c. from about 55 to about 75% other nonfat confectionery ingredients;
(II) heating the untempered chocolate confectionery composition to a temperature ranging from about 37.8° C. to about 65.5° C. to form a melt and then adjusting the temperature of the melt to a temperature ranging from about 32.2° C. to about 35° C.;
(III) filling bar moulds with the untempered chocolate confectionery composition;
(IV) removing air bubbles from the chocolate confectionery composition;

(V) rapidly cooling the bar moulds containing the chocolate confectionery composition to a temperature sufficiently low so that the chocolate confectionery composition/mould interface temperature is less than about 4.4° C.;

(VI) holding the bar mould containing the chocolate confectionery composition at a temperature of less than about 4.4° C. for from about 1 to about 5 minutes; and (VII) maintaining the chocolate confectionery composition within a temperature range of from about 4.4° C. to about 18.3° C. and at a humidity of from 0% to about 30% for a time period ranging from about 1 to about 24 hours.

20. A process for reducing the in-mould time required for preparing chocolate confectionery products, which process comprises the steps of:

(I) forming an untempered chocolate confectionery composition which contains a reduced calorie fat;

(II) heating the untempered chocolate confectionery composition to a temperature ranging from about 37.8° C. to about 65.5° C. to form a melt and then adjusting the temperature of the melt to a temperature ranging from about 29.4° C. to about 48.9° C.;

(III) filling bar moulds with 5the untempered chocolate confectionery composition;

(IV) removing air bubbles from the untempered chocolate confectionery composition;

(V) rapidly cooling the bar moulds containing the untempered chocolate confectionery composition to a temperature sufficiently low so that the chocolate confectionery composition/mould interface temperature is less than 4.4° C. to about 20° C. for about 1 to about 10 minutes; (VI) holding the bar mould containing the chocolate confectionery composition at a temperature of less than about 4.4° C. for from about 1 to about 5 minutes.

* * * * *